(12) United States Patent
Santisi

(10) Patent No.: US 8,141,931 B1
(45) Date of Patent: Mar. 27, 2012

(54) MOVABLE ROOF FOR TRANSPORTABLE TANK

(76) Inventor: Richard Santisi, North Bloomfield, OH (US)

( * ) Notice: Subject to any disclaimer, the term of this patent is extended or adjusted under 35 U.S.C. 154(b) by 0 days.

(21) Appl. No.: 12/800,695

(22) Filed: May 20, 2010

Related U.S. Application Data

(60) Provisional application No. 61/181,053, filed on May 26, 2009.

(51) Int. Cl.
*B60P 7/02* (2006.01)

(52) U.S. Cl. ............... 296/100.17; 296/26.07; 119/202

(58) Field of Classification Search ............... 296/173, 296/163, 160, 100.08, 100.17, 100.18, 26.07; 119/202, 203, 247, 265
See application file for complete search history.

(56) References Cited

U.S. PATENT DOCUMENTS

| | | | | | |
|---|---|---|---|---|---|
| 2,298,619 A | * | 10/1942 | Gorton | ............... | 52/66 |
| 2,798,760 A | * | 7/1957 | Hille | ............... | 296/173 |
| 3,184,261 A | * | 5/1965 | Young | ............... | 296/26.07 |
| 3,323,778 A | * | 6/1967 | Baker | ............... | 296/26.05 |
| 3,367,708 A | * | 2/1968 | Brown et al. | ............... | 296/173 |
| 3,403,936 A | * | 10/1968 | Young | ............... | 296/26.07 |
| 3,743,345 A | * | 7/1973 | Eckman et al. | ............... | 296/163 |
| 3,765,716 A | * | 10/1973 | Van Gompel | ............... | 296/100.08 |

* cited by examiner

*Primary Examiner* — Jason S Morrow
(74) *Attorney, Agent, or Firm* — Harpman & Harpman

(57) ABSTRACT

A moveable roof for a transportable tank for fish includes a roof platform attached to spaced roof joists secured at opposing ends to parallel headers laterally spaced and traversing a length of the roof platform. At least two pair of support arms is included, with each pair mounted on opposite sides of the tank. Further, each support arm has an upper support arm portion and a lower support arm portion. The upper and lower support arm portions are attached at a support arm pivot point. The lower support arm portion is pivotally attached to the corresponding sidewall of the tank and the upper support arm portion is pivotally attached to the header above said corresponding sidewall. Still further, a crank is positioned between the support arms of each pair of support arms. The crank has crank cables attached to each support arm of the corresponding pair of support arms, so that winding the crank pulls the upper and lower support arm portions to a vertical position to unfold the support arms and elevate the roof above the transportable tank. Stabilizing shafts can be included to further support the roof.

1 Claim, 4 Drawing Sheets

MOVABLE ROOF FOR TRANSPORTABLE TANK

This application claims the benefit of U.S. Provisional Application No. 61/181,053, filed May 26, 2009.

BACKGROUND OF THE INVENTION

Technical Field

This invention relates to transportable fishing tanks and is particularly concerned with a movable roof that extends upwardly while in use and can be descended for storage and transportation.

SUMMARY OF THE INVENTION

A movable roof for a transportable fishing tank. The movable roof being supported by support arms and stabilizing shaft. The support arms being movable between a locked and unlocked position using a crank. The roof preferably includes an extending awning attachable thereto. The awing can have a windbreaker to protect the users from wind and rain.

DETAILED DESCRIPTION OF THE INVENTION

Figure 1:
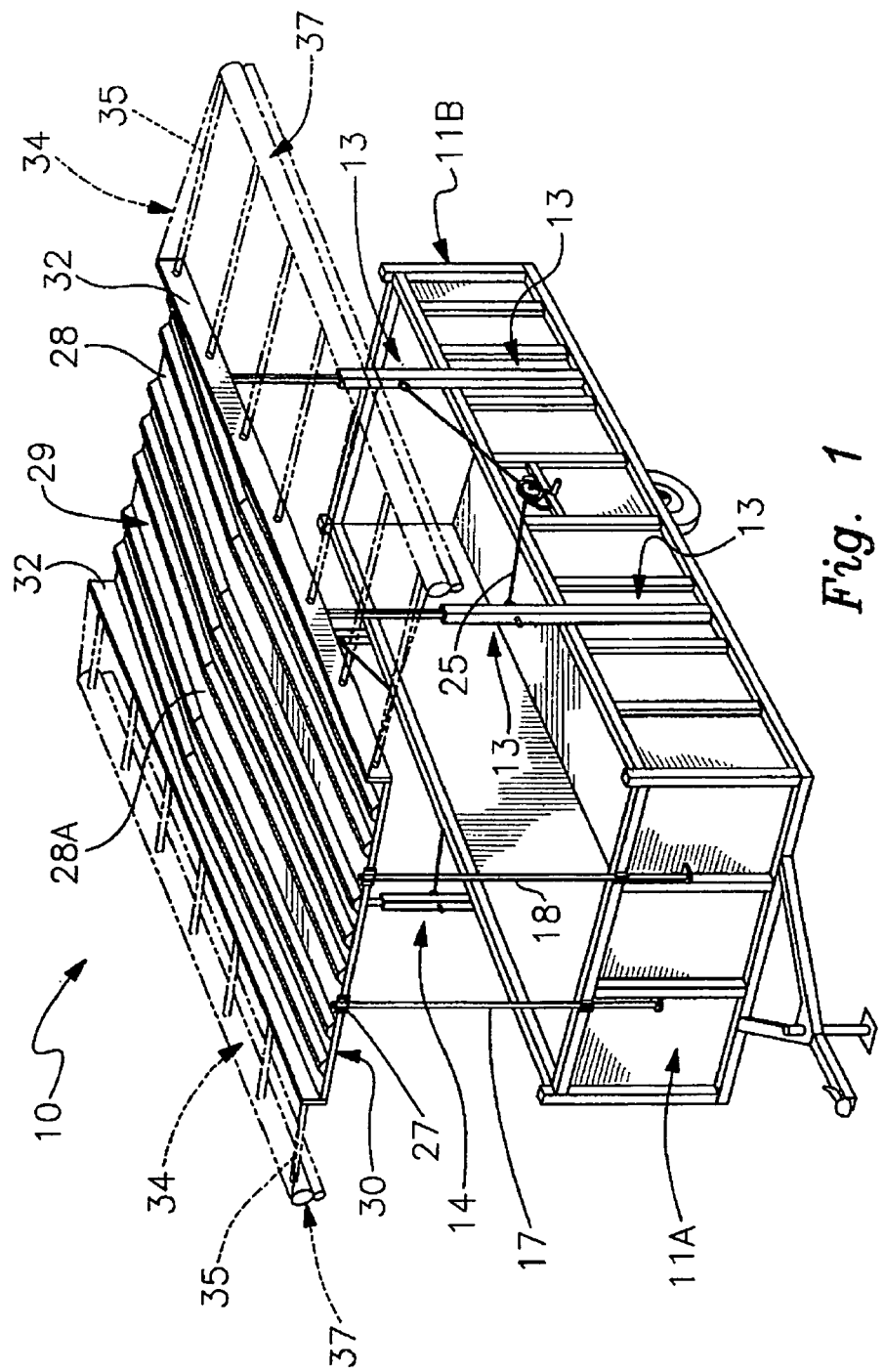
FIG. 1 is a perspective view of a transportable fishing tank with a movable roof.

The transportable fishing tank 10 show in FIG. 1 of the drawings includes a tank itself 11, preferably in rectangular form. Attached to the tank 11 is a roof 12 linked to the tank by pairs of support arms 13,14 The support arms 13,14 are movable between locked and unlocked positions using a crank assembly 15 attached to the support arms by respective crank cables 25. Front and rear linear stabilizing shaft pairs 17 & 18 further support the moveable roof 12 from lateral movement, respectively. Support arms 13,14 are preferably connected to the sidewalls of the tank 11 and the stabilizer shafts pairs 17,18 are preferably connected to the respective end walls 11a, 11b of the tank 11, although this arrangement can be reversed.

Figure 2:
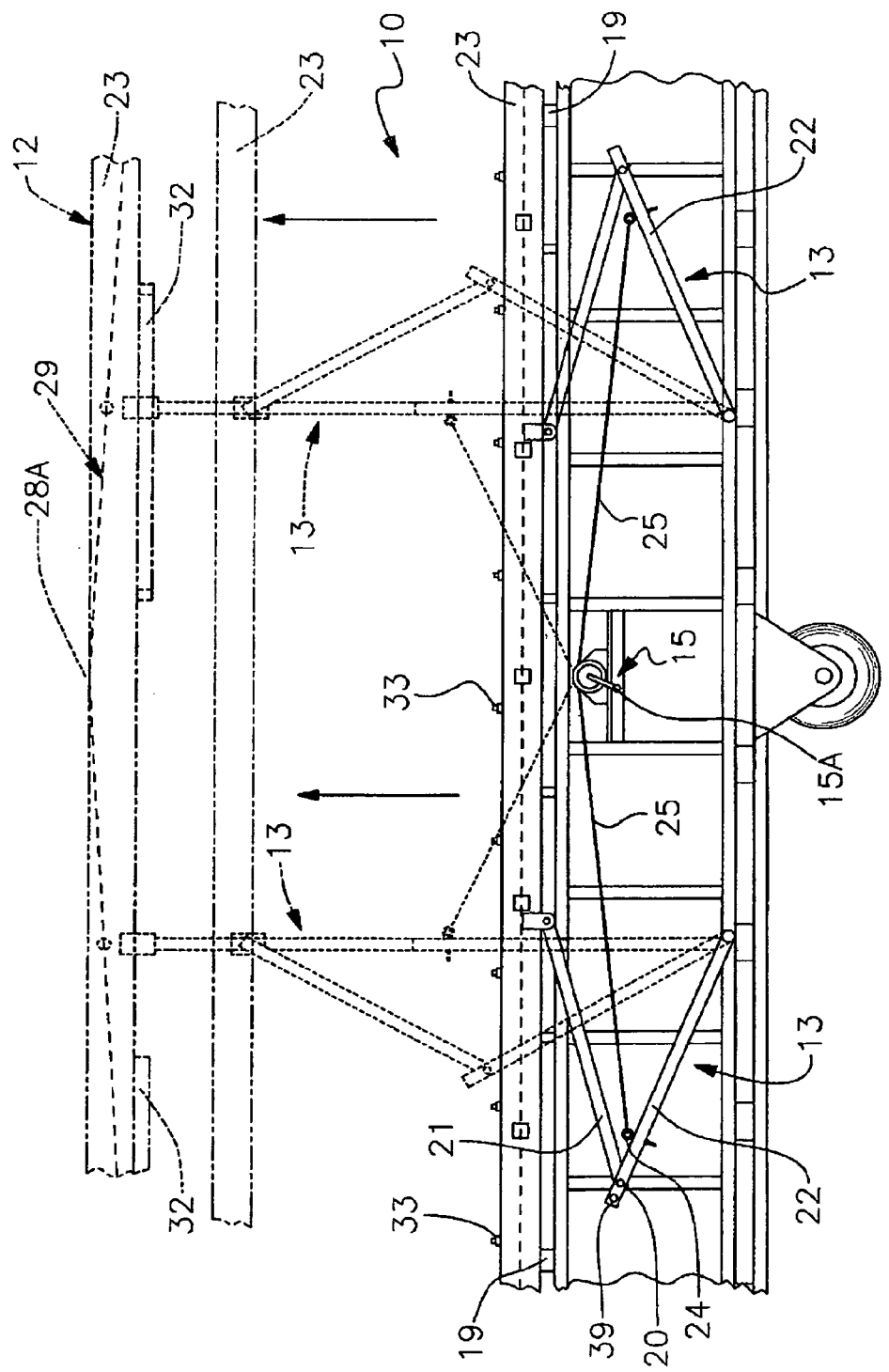
FIG. 2 is a partial elevational view of a sidewall of the transportable tank showing a crank for raising and lowering the folding roof.
Figure 3:
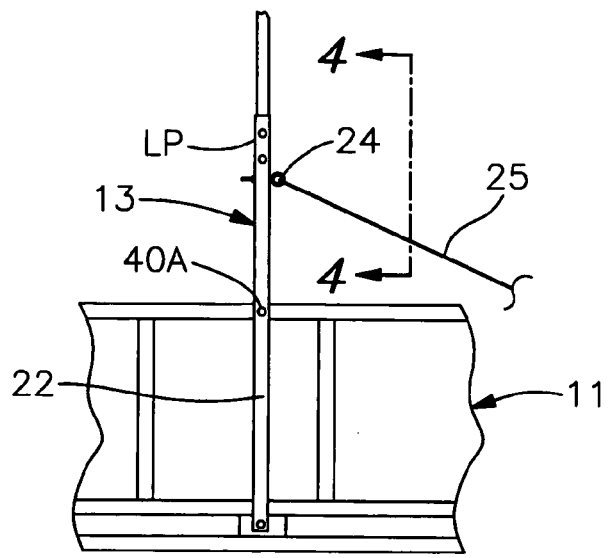
FIG. 3 is a partial side elevational view of a support arm assembly.
Figure 4:
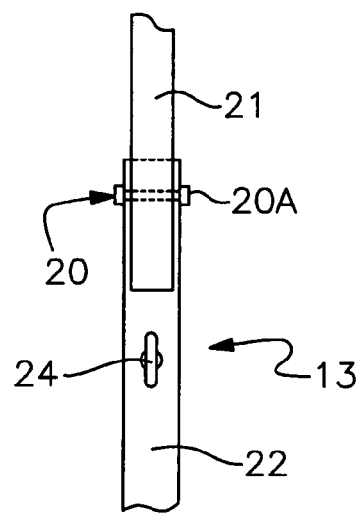
FIG. 4 is a side view on lines 4-4 of FIG. 3.

Regarding the support arms 13, 14, it is important to notice that they work in pairs on each lateral sides of the tank 11. A support arm 13 is shown in the unlocked position in FIG. 2. of the drawings. When the support arms are in the unlocked position, the moveable roof 12 is rested against the top of the tank 11 using roof-rest supports 19 spaced there about. Further, in the unlocked position, the support arms are folded about a pivot point 20 such that an upper support arm portion 21 and a lower support arm portion 22 fold together about the pivot point 20 defined by a pivot pin 20a. Each lower support arm portion 22 is pivotally attached to the sides of tank 11, and each upper support arm is pivotally attached to the roof 12, preferably at a corresponding, vertically aligned header 23.

Near the support arm pivot point 20, along the lower support arm 22 is a cable eyebolt 24, which attaches to a crank cable 25. Of course, the eyebolt 24 can be attached to the upper support arm portion 22 with the same functional result.

Figure 6:
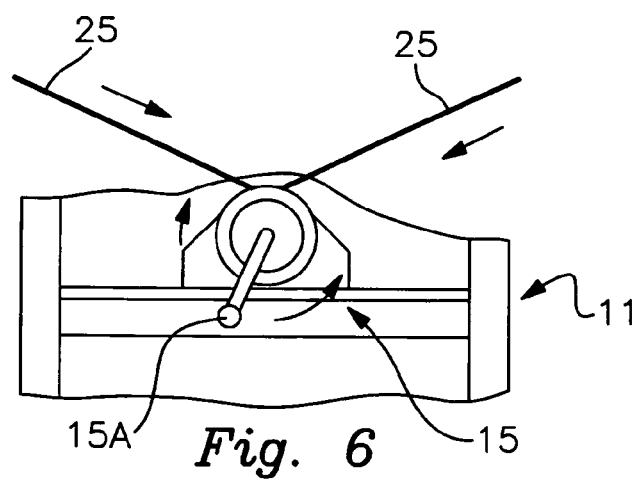
FIG. 6 is an enlarged side elevated view of a crank assembly.

Opposing crank cables 25 are attached to a central crank assembly 15 as shown in FIG. 6. of the drawings. There are crank assemblies 15 on each sidewall of the tank 11 between paired support arms 13&14 as hereinbefore described. When a crank arm 15A is turned, the crank cables 25 manipulates, in this case, the lower support arm portion 22 to the unfolded position (i.e. being pulled upward to vertical alignment) or folded position (i.e. being released to pivot downward), which in turn causes the upper support arm 21 to pivot about the support arm pivot point 20. More specifically, when the crank cables 25 are wound in by the crank 15, the support arms 13, 14 in the corresponding pairs are simultaneously pulled to the vertical, locked position, and the roof 12 is elevated above the tank 11.

Figure 5:
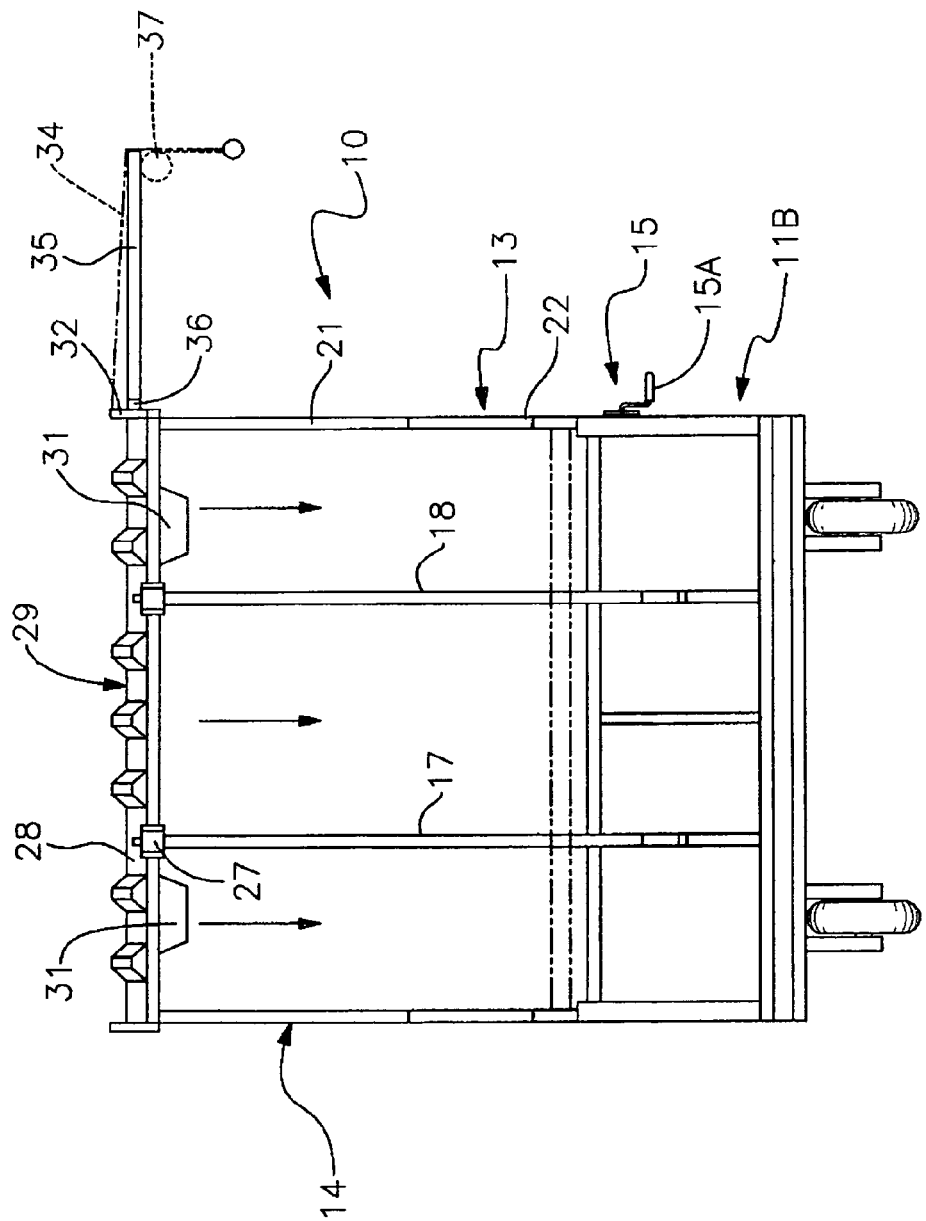
FIG. 5 is an end view of the transportable fishing tank with roof in raised position.

At the same time that the upper support arm portion 21 and lower support arm portions 22 become upright, i.e. pivoting into the fully extended support arm position the roof 12 is stabilized from lateral movement by front and rear linear stabilizing shafts 17,18, best seen in FIGS. 1 & 5 of the drawings. Each stabilizing shaft 17, 18 is secured in place relative to the roof 12 by shaft shackles 27. Shaft shackles 27 are bolted to the front-most and rear-most roof joists 28 that extend transversely between the respective roof headers, in space longitudinal relation to one another and each stabilizing shaft 17, 18 is slidably engaged to its corresponding shaft shackle 27, so that the shaft shackle slides along the length of the stabilizing shafts 17, 18 as the roof 12 vertically descends downward or ascends upward.

The moveable roof includes a roof platform having a roof top surface 29 and a roof underside 30 supported by the plurality of roof joists 28 attached to the underside 30. The roof platform 28 has a raised mid line and is angular disposed therefrom as best seen in FIG. 1 of the drawings. The moveable roof 11 may be equipped with overhead light fixtures 31 that are also attached below the roof underside 30. Attached to the roof platform on opposing longitudinal sides, to the respected roof headers 32. The headers 32 are laterally spaced and attached at opposite ends of the roof joists 28. Each roof header 32 is a longitudinal support that runs the length of the roof platform as seen in FIG. 1. of the drawings. Awning attachment studs 33 are preferably included on the top of each roof header 32. Using awning grommets, the awning attachment studs 33 connect a fabric awning 34, (shown in broken lines) to each roof header 32 on opposite sides of the tank 11, so that the awnings 34 can extend out over the respective tank sidewalls to provide shading and protection from rain and/or other weather conditions for the users. To keep the awning 34 in position, awning stabilizer joists 35 are irremovably connected to awning stabilizer ports 36. The awning stabilizer ports 36 are spaced longitudinally along the roof header 32 as best seen in FIG. 5 of the drawings.

Referring to FIG. 5 of the drawings, when the support arms pairs 13,14 are in their locked position and the awnings 34 are in their open position, a windbreaker 37 can be unrolled to further protect the user from wind and rain. Preferably, the windbreaker 37 is a clear, plastic sheet that is attached to the awning.

In operation, when the moveable roof 12 is in the down position and the transportable tank 11 has been parked and secured at its transported location, the roof 12 is raised by substantially simultaneously rotating each of the crank arms, or independently and alternately rotating each crank a few rotations, so that the roof is raised substantially horizontal.

Once the support arms 13,14 are substantially vertical, the lower support arm portion 22 is locked to the upper support arm portion 21 using a locking pin LP passing through the support arm locking pin openings. Also, each support arm 13,14 is further secured to the tank 11 in the vertical position using a nut and bolt passed through securing holes 40A, to secure the lower support arm to its corresponding sidewall.

It should be noted that the present invention could be practiced otherwise than as specifically illustrated and described, without departing from its spirit or scope. It is intended that all such modifications and alterations be included insofar as they are consistent with the objectives and spirit of the invention.

Therefore I claim:

1. A moveable roof for a transportable tank, said tank having sidewalls and end walls, the roof comprising a roof platform attached to spaced roof joists secured at opposing ends to parallel headers laterally spaced and traversing a length of the roof platform, at least two pair of support arms, each pair mounted on opposite sidewalls of the tank, each support arm having an upper support arm portion and a lower support arm portion, the upper and lower support arm portions being attached at a support arm pivot point, the lower support arm portion being pivotally attached to the corresponding sidewalls of the tank and the upper support arm portion being pivotally attached to the header above said sidewalls, roof stabilizing shafts on said end walls, a crank positioned between the support arms of each pair of support arms, the crank having crank cables attached to each support arm of the corresponding pair of support arms, so that winding the crank pulls the upper and lower support arm portions to a vertical position to unfold the support arms and elevate the roof above the transportable tank, an awning attached to at least one of the headers by awing stabilizing joists, awning stabilizing ports and awning stabilizing studs.

* * * * *